(12) United States Patent
Yang et al.

(10) Patent No.: US 11,272,179 B2
(45) Date of Patent: Mar. 8, 2022

(54) DEVICE AND METHOD FOR CODING VIDEO DATA

(71) Applicant: FG Innovation Company Limited, Tuen Mun (HK)

(72) Inventors: Yu-Chiao Yang, Taipei (TW); Chih-Yu Teng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/953,265

(22) Filed: Nov. 19, 2020

(65) Prior Publication Data

US 2021/0160494 A1    May 27, 2021

Related U.S. Application Data

(60) Provisional application No. 62/939,417, filed on Nov. 22, 2019.

(51) Int. Cl.
| | |
|---|---|
| *H04N 19/119* | (2014.01) |
| *H04N 19/176* | (2014.01) |
| *H04N 19/46* | (2014.01) |
| *H04N 19/105* | (2014.01) |
| *H04N 19/137* | (2014.01) |

(52) U.S. Cl.
CPC ......... *H04N 19/119* (2014.11); *H04N 19/105* (2014.11); *H04N 19/137* (2014.11); *H04N 19/176* (2014.11); *H04N 19/46* (2014.11)

(58) Field of Classification Search
None
See application file for complete search history.

(56) References Cited

U.S. PATENT DOCUMENTS

| | | | | |
|---|---|---|---|---|
| 2021/0144374 A1* | 5/2021 | Esenlik | ................ | H04N 19/182 |
| 2021/0152825 A1* | 5/2021 | Reuze | ................ | H04N 19/119 |

* cited by examiner

*Primary Examiner* — Chikaodili E Anyikire
(74) *Attorney, Agent, or Firm* — ScienBiziP, P.C.

(57) ABSTRACT

A method of decoding a bitstream by an electronic device is provided. A block unit is determined from an image frame received from the bitstream. A split line of the block unit is determined based on a split angle and a split distance of the block unit determined based on the bitstream. First motion information and second motion information are received from a candidate list for reconstructing the block unit. A parameter value of a sub-block determined in the block unit is determined based on a location of the sub-block, the split angle and the split distance. A predefined one of the first and the second motion information is stored for the sub-block when the parameter value is greater than a first threshold and less than second threshold. A subsequent block is reconstructed based on the stored motion information when the subsequent block is reconstructed based on the sub-block.

19 Claims, 6 Drawing Sheets

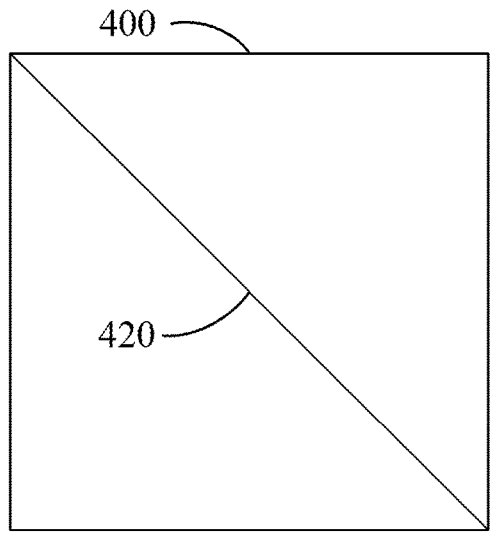
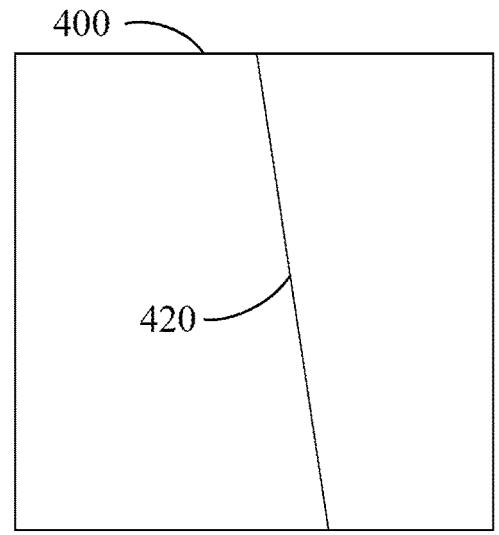
FIG. 4A
FIG. 4B
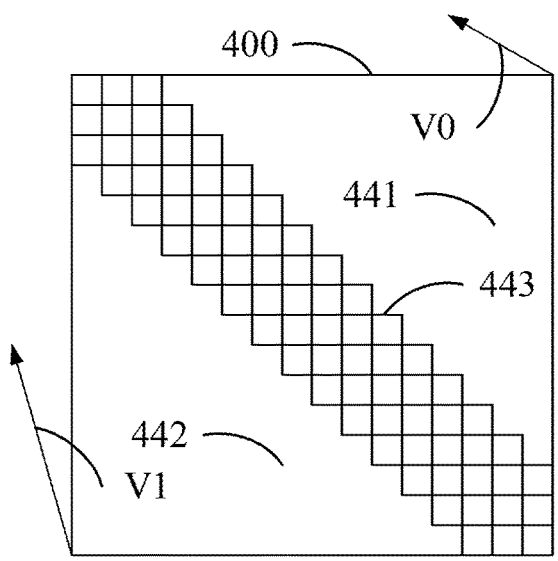
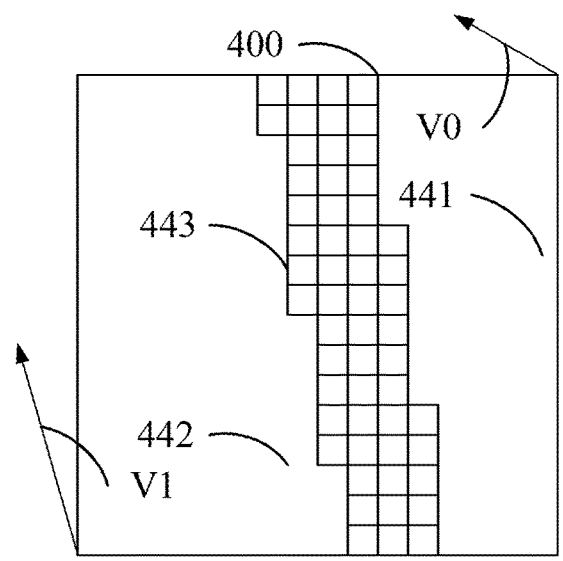
FIG. 4C
FIG. 4D

DEVICE AND METHOD FOR CODING VIDEO DATA

CROSS-REFERENCE TO RELATED APPLICATION(S)

The present disclosure claims the benefit of and priority to U.S. Provisional Patent Application Ser. No. 62/939,417, filed on Nov. 22, 2019, entitled "Motion Storing Process for Geometric Partition Prediction" (hereinafter referred to as "'417 provisional"). The disclosure of '417 provisional is hereby incorporated fully by reference into the present disclosure.

FIELD

The present disclosure is generally related to video coding, and specifically, to techniques for storing motion information of a block unit in an image frame to predict a plurality of subsequent blocks.

BACKGROUND

Geometric partitioning mode is a coding tool in a video coding method. In the geometric partitioning mode, the encoder may select two of a plurality of merge candidates for predicting the block unit and provide two merge indices into a bitstream for the decoder to recognize the selected merge candidates.

An encoder and a decoder may split a block unit in an image frame to generate a plurality of sub-blocks, and store at least one of the two merge candidates for each of the sub-blocks in a corresponding buffer to predict a plurality of subsequent blocks. However, in the geometric partitioning mode, some of a plurality of block components in the block unit may be predicted based on only one of the two merge candidates, and other of the plurality of block components may be predicted based on both of the two merge candidates. If the two merge candidates are stored for each of the sub-blocks predicted based on both the merge candidates, the stored motion candidates may be too complex for the subsequent prediction.

SUMMARY

The present disclosure is directed to a device and method for storing motion information for a sub-block of a block unit predicted in the geometric partitioning mode.

In a first aspect of the present disclosure, a method for decoding a bitstream and an electronic device for performing the method are provided. The method comprises receiving an image frame of the bitstream; determining a block unit from the received image frame; determining a split line of the block unit based on a split angle and a split distance of the block unit, wherein the split angle and the split distance of the block unit are determined based on the bitstream; receiving first motion information and second motion information from a candidate list for reconstructing the block unit based on the first motion information, the second motion information and the split line; determining a sub-block in the block unit; determining a parameter value of the sub-block based on a location of the sub-block, the split angle and the split distance; storing a predefined one of the first motion information and the second motion information as a stored motion information for the sub-block when the parameter value is greater than a first threshold and less than a second threshold; and reconstructing a subsequent block based on the stored motion information when the subsequent block is reconstructed based on the sub-block.

In a second aspect of the present disclosure a method for decoding a bitstream and an electronic device for performing the method are provided. The method comprises receiving an image frame of the bitstream; determining a block unit from the received image frame; determining a split line of the block unit based on a split angle and a split distance of the block unit, wherein the split angle and the split distance of the block unit are determined based on the bitstream; receiving first motion information and second motion information from a candidate list for reconstructing the block unit based on the first motion information, the second motion information and the split line; determining a sub-block in the block unit; determining a parameter value of the sub-block based on a location of the sub-block, the split angle and the split distance; determining whether to store a predefined one of the first motion information and the second motion information as a stored motion information for the sub-block based on a comparison between the parameter value and a value range; and reconstructing a subsequent block based on the stored motion information when the subsequent block is reconstructed based on the sub-block.

BRIEF DESCRIPTION OF THE DRAWINGS

Aspects of the present disclosure are best understood from the following detailed disclosure when read with the accompanying figures. Various features are not drawn to scale and dimensions of various features may be arbitrarily increased or reduced for clarity of discussion.

FIGS. 4A-4D are schematic illustrations of a block unit having different prediction areas separated based on a split line, according to example implementations of the present disclosure.

DESCRIPTION

Figure 1:
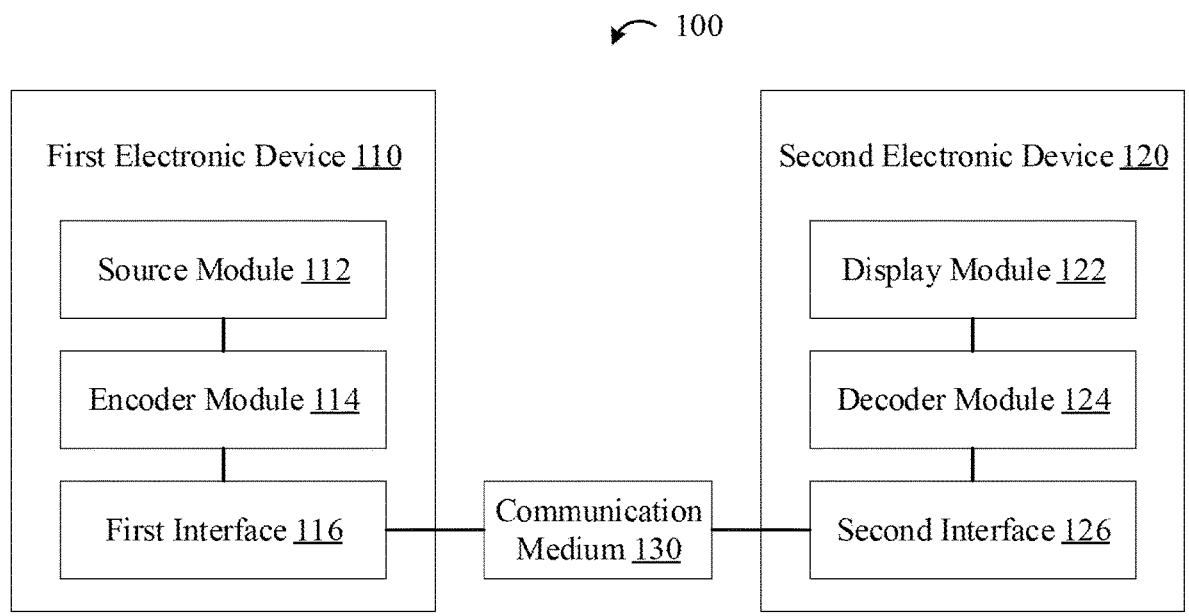
FIG. 1 illustrates a block diagram of a system configured to encode and decode video data according to an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art.

Unless noted otherwise, like or corresponding elements among the figures may be indicated by like or corresponding reference numerals. The drawings and illustrations in the present disclosure are generally not to scale and are not intended to correspond to actual relative dimensions.

For the purpose of consistency and ease of understanding, like features are identified (although, in some examples, not illustrated) by numerals in the exemplary figures. However, the features in different implementations may differ in other respects and shall not be narrowly confined to what is illustrated in the figures.

The disclosure uses the phrases "in one implementation," or "in some implementations," may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series and the equivalent.

For purposes of explanation and non-limitation, specific details such as functional entities, techniques, protocols, and standards are set forth for providing an understanding of the disclosed technology. In other examples, detailed disclosure of well-known methods, technologies, systems and architectures are omitted so as not to obscure the disclosure with unnecessary details.

Persons skilled in the art will immediately recognize that any disclosed coding function(s) or algorithm(s) described in the present disclosure may be implemented by hardware, software or a combination of software and hardware. Described functions may correspond to modules may be software, hardware, firmware, or any combination thereof.

A software implementation may include computer executable instructions stored on computer readable medium such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of applications specific integrated circuitry (ASIC), programmable logic arrays, and/or using one or more digital signal processors (DSPs). Although some of the disclosed implementations are oriented to software installed and executing on computer hardware, alternative implementations implemented as firmware or as hardware or combination of hardware and software are well within the scope of the present disclosure. The computer readable medium includes but is not limited to random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 illustrates a block diagram of a system 100 configured to encode and decode video data according to an example implementation of the present disclosure.

The system 100 includes a first electronic device 110, a second electronic device 120, and a communication medium 130. The first electronic device 110 may be a source device including any device configured to encode video data and transmit encoded video data to the communication medium 130. The second electronic device 120 may be a destination device including any device configured to receive encoded video data via the communication medium 130 and to decode encoded video data.

In at least one implementation, the first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

In at least one implementation, the first electronic device 110 and/or the second electronic device 120 may be a mobile phone, a tablet, a desktop, a notebook, or other electronic devices. FIG. 1 merely illustrates one example of the first electronic device 110 and the second electronic device 120. The first electronic device 110 and second electronic device 120 may include more or less components than illustrated or have a different configuration of the various components.

In at least one implementation, the source module 112 may include a video capture device to capture a new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

In at least one implementation, the encoder module 114 and the decoder module 124 may each be implemented as any of a variety of suitable encoder/decoder circuitry such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When implemented partially in software, a device may store instructions for the software in a suitable, non-transitory computer-readable medium and execute the instructions in hardware using one or more processors to perform the disclosed methods. In at least one implementation, each of the encoder module 114 and the decoder module 124 may be included in one or more encoders or decoders, any of which may be integrated as part of a combined encoder/decoder (CODEC) in a device.

In at least one implementation, the first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 116 and the second interface 126 may each include any device configured to transmit and/or store a compliant video bitstream via the communication medium 130 and to receive the compliant video bitstream via the communication medium 130.

In at least one implementation, the first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 122 may include a display using liquid crystal display (LCD) technology, plasma display technology, organic light emitting diode (OLED) display technology, or light emitting polymer display (LPD) technology with other display technologies used in other implementations. The display module 122 may include a high-definition display or an ultra-high definition display.

Figure 2:
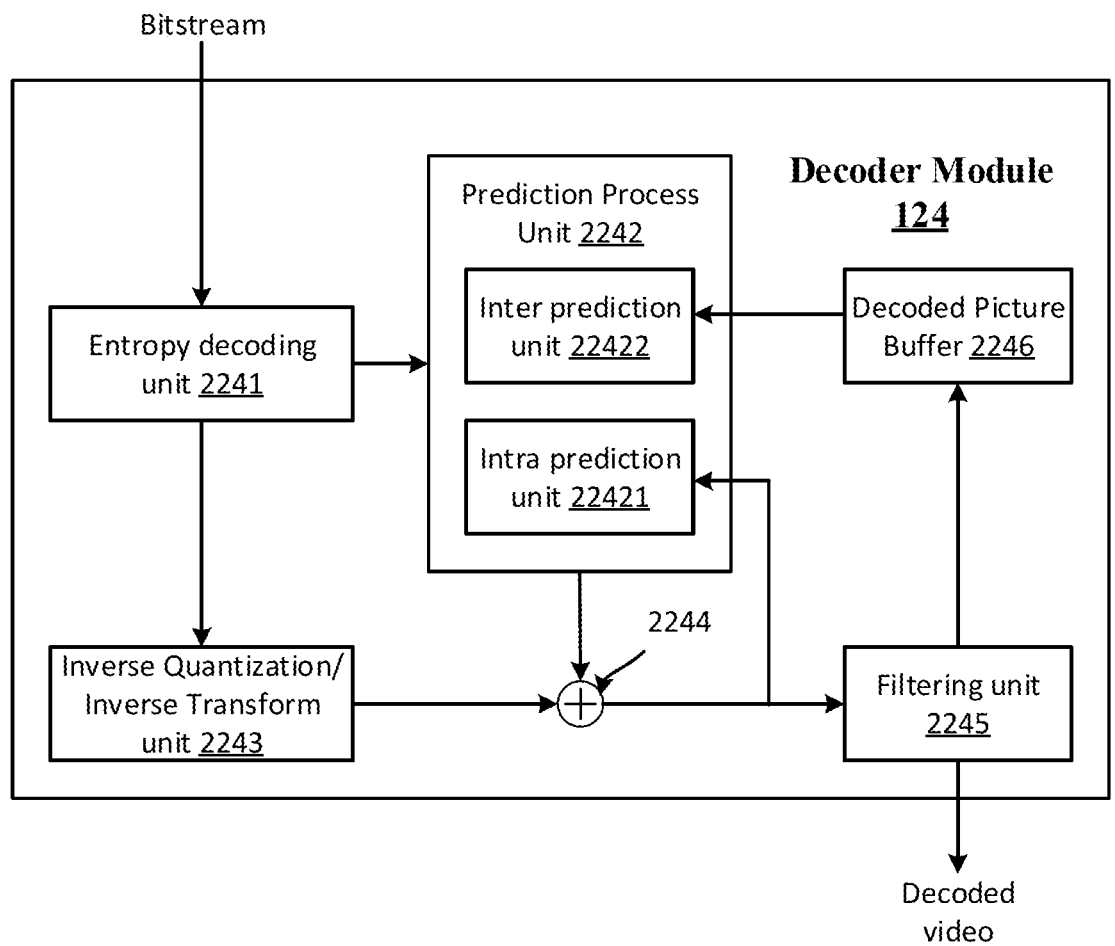
FIG. 2 illustrates a block diagram of the decoder module of the second electronic device in FIG. 1 according to an example implementation of the present disclosure.

FIG. 2 illustrates a block diagram representing an implementation of the decoder module 124 of the second electronic device 120 in FIG. 1, according to an example implementation of the present disclosure. The decoder module 124 includes an entropy decoder (e.g., an entropy decoding unit 2241), a prediction processor (e.g., a prediction process unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction process unit 2242 further includes an intra prediction processor (e.g. an intra prediction unit 22421) and an inter prediction processor (e.g. an inter prediction unit 22422). The decoder module 124 receives a bitstream and decodes the bitstream to output decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

In at least one implementation, the entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

In at least one implementation, the prediction process unit 2242 may receive syntax elements such as motion vectors, intra modes, partition information, and other syntax information from the entropy decoding unit 2241. The prediction process unit 2242 may receive the syntax elements including the partition information and divide image frames according to the partition information.

In at least one implementation, each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2242 receives predicted data including the intra mode or the motion vector for a current image block of a specific one of the image frames. The current image block may be the luminance block or one of the chrominance blocks in the specific image frame.

In at least one implementation, the intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. In at least one implementation, the intra prediction unit 22421 may reconstruct a plurality of chroma components of the current block unit based on a plurality of luma components of the current block unit when the chroma components are reconstructed by the prediction process unit 2242.

In at least one implementation, the intra prediction unit 22421 may reconstruct a plurality of chroma components of the current block unit based on the plurality of luma components of the current block unit when the luma components of the current block are reconstructed by the prediction process unit 2242.

In at least one implementation, the inter prediction unit 22422 may perform inter-predictive coding of the current block unit relative to one or more blocks in one or more reference image blocks based on syntax elements related to the motion vector in order to generate the predicted block.

In at least one implementation, the motion vector may indicate a displacement of the current block unit within the current image block relative to a reference block unit within the reference image block. The reference block unit is a block determined to closely match the current block unit.

In at least one implementation, the inter prediction unit 22422 receives the reference image block stored in the decoded picture buffer 2246 and reconstructs the current block unit based on the received reference image blocks.

In at least one implementation, the inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

In at least one implementation, the inverse transformation may be inversely applied by the transformation process such as discrete cosine transform (DCT), discrete sine transform (DST), adaptive multiple transform (AMT), mode-dependent non-separable secondary transform (MDNSST), hypercube-givens transform (HyGT), signal dependent transform, Karhunen-Loéve transform (KLT), wavelet transform, integer transform, sub-band transform or a conceptually similar transform.

In at least one implementation, the inverse transformation may convert the residual information from a transform domain, such as a frequency domain, back to the pixel domain. In at least one implementation, the degree of inverse quantization may be modified by adjusting a quantization parameter. The summer 2244 adds the residual block to the predicted block from the prediction process unit 2242 to produce a reconstructed block.

In at least one implementation, the summer 2244 adds the reconstructed residual block to the predicted block provided from the prediction process unit 2242 to produce a reconstructed block.

In at least one implementation, the filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter and the ALF. Such filters are not explicitly illustrated for brevity but may filter the output of the summer 2244.

The filtering unit 2245 may output the decoded video to the display module 122 or other video receiving unit after the filtering unit 2245 performs the filtering process for the reconstructed blocks of the specific image frame.

In at least one implementation, the decoded picture buffer 2246 may be a reference picture memory that stores the reference block for use by the prediction process unit 2242 in decoding the bitstream (in inter coding modes). The decoded picture buffer 2246 may be formed by any of a variety of memory devices such as dynamic random-access memory (DRAM), including synchronous DRAM (SDRAM), magneto-resistive RAM (MRAM), resistive RAM (RRAM), or other types of memory devices.

In at least one implementation, the decoded picture buffer 2246 may be on-chip with other components of the decoder module 124 or off-chip relative to those components.

Figure 3:
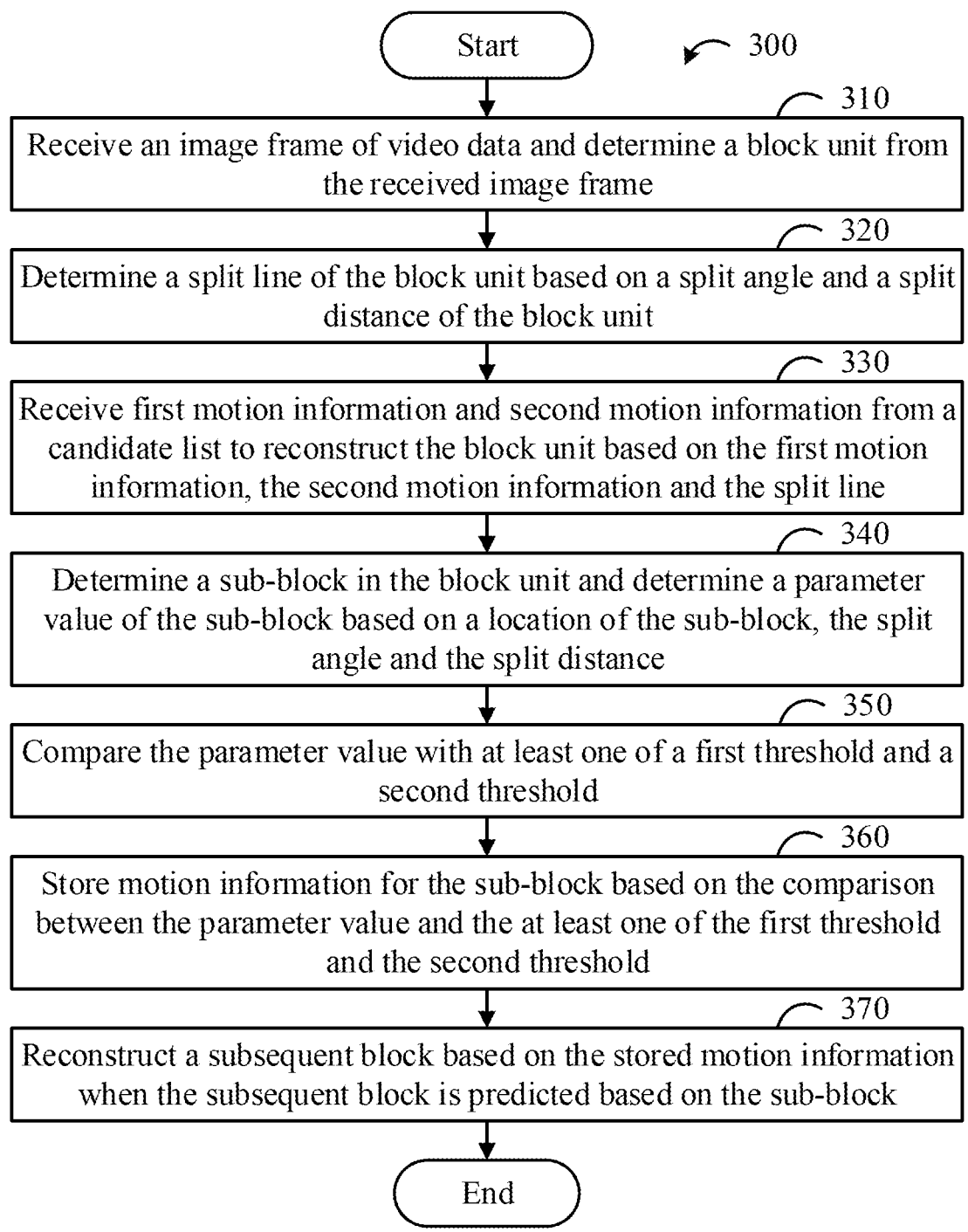
FIG. 3 illustrates a flowchart of a method for reconstructing a block unit according to an example implementation of the present disclosure.

FIG. 3 illustrates a flowchart of a method 300 for reconstructing a block unit according to an example implementation of the present disclosure. The method 300 is an example only as there are a variety of ways to perform the method.

The method 300 may be performed using the configurations illustrated in FIG. 1 and FIG. 2 and various elements of these figures are referenced with regard to the method 300. Each block illustrated in FIG. 3 may represent one or more processes, methods, or subroutines performed.

Furthermore, the order of blocks is illustrative only and may change. Additional blocks may be added or less blocks may be utilized without departing from the present disclosure.

At block 310, the decoder module 124 receives an image frame of video data and determines a block unit from the received image frame according to the received video data. The video data may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The decoder module 124 may determine the image frame based on the bitstream and divide the image frame to determine the block unit according to a plurality of partition indications in the bitstream. For example, the decoder module 124 may divide the image frames to generate a plurality of coding tree units and may further divide one of the coding tree units to determine the block unit according to the partition indications (e.g., based on a video coding standard).

In at least one implementation, the entropy decoding unit 2241 may decode the bitstream to determine a plurality of prediction indications for the block unit and the decoder module 124 may further reconstruct the block unit based on the prediction indications. The prediction indications may include a plurality of flags and a plurality of indices.

At block 320, the decoder module 124 determines a split line of the block unit based on a split angle and a split distance of the block unit.

In at least one implementation, with reference to FIG. 2, the decoder module 124 may divide the block unit into a plurality of prediction areas based on the split line of the block unit.

In at least one implementation, the prediction indications may include a partition index of the block unit. The partition index may indicate the split line of the block unit. In at least one implementation, the partition index may indicate a partition angle index and a partition distance index when the partition index is a geometric partition index. The partition angle index may indicate the split angle of the split line, and the partition distance index may indicate the split distance between the split line and a center point of the block unit. Thus, the decoder module 124 may determine the split line based on the split angle and the split distance indicated by the partition index. In at least one implementation, the prediction indications of the bitstream may include the partition angle index and the partition distance index.

FIGS. 4A-4B are schematic illustrations of a block unit having different prediction areas separated based on a split line, according to example implementations of the present disclosure. In at least one implementation, the partition indications of the block unit 400 may indicate the split line 420. In at least one implementation, the block unit 400 may include a plurality of block components. In the present implementation, the plurality of block components in the block unit 400 are divided into a plurality of prediction areas based on the split line 420. In one implementation, the number of the prediction areas may be equal to three. FIGS. 4C-4D are schematic illustrations of a block unit having different prediction areas separated based on the split line, according to example implementations of the present disclosure. In the present implementation, the decoder module 124 may divide the block unit 400 based on the split line 420 to determine the prediction areas 441-443. In the present implementation, a third one of the prediction areas 443 covers the split line 420 and separates a first one of the prediction areas 441 from a second one of the prediction areas 442.

At block 330, the decoder module 124 determines first motion information and second motion information from a candidate list to reconstruct the block unit based on the first motion information, the second motion information and the split line.

In at least one implementation, with reference to FIG. 2 and FIGS. 4A-4D, the decoder module 124 may divide the block unit 400 into the plurality of prediction areas 441-443 based on the split line 420 of the block unit 400 and reconstruct the plurality of prediction areas 441-443 based on the first motion information and the second motion information.

In at least one implementation, the prediction indications may include a first motion candidate index and a second motion candidate index. In at least one implementation, the first motion candidate index may indicate the first motion information in a merge candidate list, and the second motion candidate index may indicate the second motion information in the merge candidate list. In at least one implementation, a plurality of merge candidate modes in the merge candidate list may be selected from a plurality of spatial motion prediction modes of a plurality of neighboring blocks neighboring the block unit, a plurality of temporal motion prediction modes of a plurality of collocated blocks, history-based motion prediction modes stored in a first-in-first-out (FIFO) table, a plurality of pair-wise average motion prediction modes, and a zero motion mode. In at least one implantation, the first motion information may indicate a first reference frame and a first reference vector V0, and the second motion information may indicate a second reference frame and a second reference vector V1. The first reference frame and the second reference frame may be selected from a plurality of reference lists of the block unit. In one implementation, the first reference frame and the second reference frame may be selected from the same one of the reference lists. In other implementations, the first reference frame and the second reference frame may be selected from different reference lists. In at least one implementation, the first reference list and the second reference list are set as L0 and L1 when the number of the reference lists may be equal to 2.

In at least one implementation, the first motion information may include a first list flag for selecting the first reference frame and the second motion information may included a second list flag for selecting the second motion information. In at least one implementation, the first reference frame and the second reference frame are selected from the same reference list when the first list flag is equal to the second list flag. For example, the second reference list L1 corresponding to a flag value different from 0 may not be used to reconstruct the block unit 400 when the first reference frame and the second reference frame are included in the first reference list L0 indicated by the first list flag and the second list flag equal to 0. In addition, the first reference frame and the second reference frame are selected from different reference lists when the first list flag is different from the second list flag. For example, the second reference frame is included in the second reference list L1 indicated by the second list flag equal to 1 when the first reference frame is included in the first reference list L0 indicated by the first list flag equal to 0.

In at least one implementation, the block components in the first prediction area 441 may be reconstructed based on the first reference vector V0 and the first reference frame, and the block components in the second prediction area 442 may be reconstructed based on the second reference vector V1 and the second reference frame. In addition, the block components in the third prediction area 443 may be reconstructed based on the first reference vector V0, the second reference vector V1, the first reference frame and the second reference frame. The block components in the third prediction area 443 may be reconstructed by deriving a plurality of first reference samples determined based on the first reference vector V0 and the first reference frame and a plurality of second reference samples determined based on the second reference vector V1 and the second reference frame and merging the first reference samples and the second reference samples based on a plurality of blending weights. In at least one implementation, the blending weights may be derived based on a plurality of component distances between the split line 420 and the block components in the third prediction area 443.

At block 340, the decoder module 124 determines a sub-block in the block unit and determines a parameter value of the sub-block based on a location of the sub-block, the split angle and the split distance.

Figures 5A, 5B, 5C:
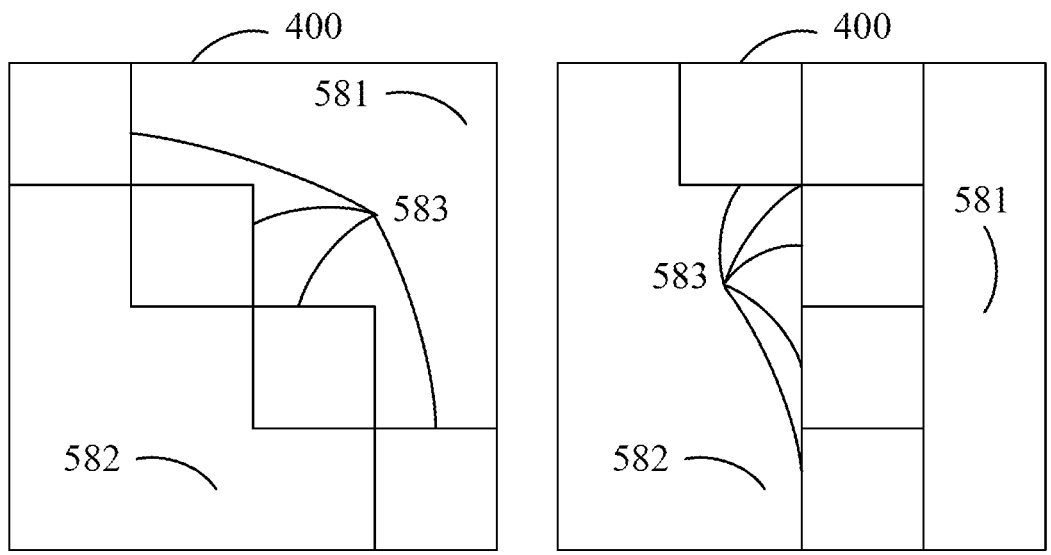
FIGS. 5A-5C are schematic illustrations of a block unit having a plurality of sub-blocks categorized into different block areas, according to example implementations of the present disclosure.

In at least one implementation, with reference to FIG. 2, the decoder module 124 may divide the block unit to generate a plurality of sub-blocks. FIGS. 5A-5C are schematic illustrations of a block unit having a plurality of sub-blocks categorized into different block areas, according to example implementations of the present disclosure. FIG. 5A is a schematic illustration of a block unit having a plurality of sub-blocks 561-576 each corresponding to a sub-block index (xSbIdx, ySbIdx), according to example implementations of the present disclosure. In at least one implementation, the decoder module 124 may determine a specific one of the sub-blocks. In one implementation, the number numSbX of a plurality of first candidate indices for the first position index xSbIdx may be equal to four, and the number numSbY of a plurality of second candidate indices for the second position index ySbIdx may be equal to four. Thus, the first position index xSbIdx may be a number between zero and numSbX−1, and the second position index ySbIdx may be a number between zero and numSBY−1.

In at least one implementation, with reference to FIG. 4C and FIG. 5A, the block components in one of the sub-blocks 561-576 may be included in different prediction areas 441-443. For example, one of the block components in the sub-block 561 is included in the first prediction area 441, another one of the block components in the sub-block 561 is included in the second prediction area 442, and the others in the sub-block 561 are included in the third prediction area 443. In addition, the block components in one of the sub-blocks 561-576 may be included in the same prediction area. For example, each of the block components in the sub-block 564 is included in the first prediction area 561.

In at least one implementation, with reference to FIG. 2, FIG. 4A and FIG. 5A, the decoder module 124 may determine the parameter value for each of the sub-blocks 561-576. In at least one implementation, a corresponding one of the parameter values may be computed for a specific one of the sub-blocks 561-576 based on a location of the specific sub-block and the split line 420 determined according to the split angle and the split distance. For example, a first one of the parameter values may be computed for the first sub-block 561 based on the location of the first sub-block 561 and the split line 420. In at least one implementation, the decoder module 124 may determine four corners of the specific sub-block, determine a plurality of weighting parameters for the four corners of the specific sub-block based on a relationship between the location of the specific sub-block and the split line, and compute the parameter value for the specific sub-block based on the weighting parameters. In at least one implementation, the parameter value may be generated by averaging the plurality of weighting parameters of the four corners of the specific sub-block. In at least one implementation, the decoder module 124 may compute the parameter value for each of the sub-blocks 561-576 based on the other computing methods.

At block 350, the decoder module 124 compares the parameter value with at least one of a first threshold and a second threshold.

In at least one implementation, with reference to FIG. 2 and FIG. 5A, the decoder module 124 may compare the parameter value with the at least one of the first threshold and the second threshold to divide the sub-blocks 561-562 of the block unit 400 to generate a plurality of block areas.

In at least one implementation, the decoder module 124 may categorize the sub-blocks 561-576 of the block unit 400 into the block areas based on the comparison between the parameter values and the at least one of the first threshold and the second threshold. Thus, the block areas may be divided from the block unit 400 based on the parameter values of the sub-blocks generated according to the locations of the sub-blocks and the split line.

In at least one implementation, a specific one of the sub-blocks may be included in a first one of the three block areas when a corresponding one of the parameter values of the specific sub-block is less than or equal to the first threshold. In addition, the specific sub-block may be included a second one of the three block areas when the corresponding parameter value of the specific sub-block is greater than or equal to the second threshold, and the specific sub-block may be included in a third one of the three block areas when the corresponding parameter value of the specific sub-block is greater than the first threshold and less than the second threshold. In at least one implementation, the second threshold is greater than the first threshold.

FIGS. 5B-5C are schematic illustrations of a block unit having the different block areas separated based on the comparison between the parameter value and the at least one of the first threshold and the second threshold, according to example implementations of the present disclosure. In at least one implementation, three block areas 581-583 are determined based on the comparison between the parameter values of the sub-block 561-576 and the at least one of the first threshold and the second threshold. In the present implementation, the first block area 581 and the second block area 582 may be separated by the third block area 583 covering the split line 420. With reference to FIG. 4C and FIG. 5B, most of the block components of the sub-blocks in the first block area 581 may be included in the first prediction area 441 and reconstructed based on the first motion information, and most of the block components of the sub-blocks in the second block area 582 may be included in the second prediction area 442 and reconstructed based on the second motion information. In addition, most of the block components of the sub-blocks in the third block area 583 may be included in the third prediction area 443 and reconstructed based on the first motion information and the second motion information.

In at least one implementation, the prediction areas 441-443 are generated by dividing the block unit 400 based on the block components of the block unit 400, and the block areas 581-583 are generated by dividing the block unit 400 based on the sub-blocks 561-576 of the block unit 400. Thus, the prediction areas 441-443 are different from the block areas 581-583.

At block 360, the decoder module 124 stores motion information for the sub-block based on the comparison between the parameter value and the at least one of the first threshold and the second threshold.

In at least one implementation, with reference to FIG. 2 and FIGS. 5B and 5C, the decoder module 124 may determine the stored motion information for a specific one of the sub-blocks from the first motion information and the second motion information based on a corresponding one of the block areas 581-583 determined from the comparison between a corresponding one of the parameter values of the specific sub-block and the at least one of the first threshold and the second threshold.

In at least one implementation, the decoder module 124 may store the predefined one of the first motion information and the second motion information as the stored motion information for the specific sub-block when the corresponding parameter value of the specific sub-block is included in a value range of the first threshold to the second threshold. In at least one implementation, the decoder module 124 may store the first motion information as the stored motion information for the specific sub-block when the corresponding parameter value is less than or equal to the first threshold. In addition, the decoder module 124 may store the second motion information as the stored motion information for the specific sub-block when the corresponding parameter value is greater than or equal to the second threshold.

In at least one implementation, the decoder module 124 may store the first motion information for the specific sub-block when the specific sub-block having the corresponding parameter value less than or equal to the first threshold is included in the first block area 581 corresponding to the first prediction area 441. For example, the decoder module 124 may store the first motion information for the sub-blocks 562-564, 567-568 and 572, since the sub-blocks 562-564, 567-568 and 572 are included in the first block area 581. In addition, the decoder module 124 may store the second motion information for the specific sub-block when the specific sub-block having the corresponding parameter value greater than or equal to the second threshold is included in the second block area 582 corresponding to the second prediction area 442. For example, the decoder module 124 may store the second motion information for the sub-blocks 565, 569-570 and 573-575, since the sub-blocks 562-564, 567-568 and 572 are included in the second block area 582. In other words, the decoder module 124 may directly store a corresponding one of the first motion information and the second motion information for the sub-blocks included in the block areas different from the block area 583 coving the split line.

In at least one implementation, most of the block components of the sub-blocks in the third block area 583 may be reconstructed based on the first motion information and the second motion information. Thus, the decoder module 124 may store at least one of the first motion information and the second motion information for the specific sub-block when the specific sub-block having the corresponding parameter value within the value range is included in the third block area 583 corresponding to the third prediction area 443. For example, the decoder module 124 may store at least one of the first motion information and the second motion information for the sub-blocks 561, 566, 571 and 576, since the sub-blocks 561, 566, 571 and 576 are included in the third block area 583. Since the stored motion information is stored for a plurality of subsequent blocks to be reconstructed based on the stored motion information, the stored motion information may not influence a plurality of residual components generated based on blending results of the first reference samples and the second reference samples. Thus, the decoder module 124 may directly select one of the first motion information and the second motion information to decrease the usage of a buffer and decrease the coding complexity. Thus, with reference to FIG. 1, the encoder module 114 and the decoder module 124 may store the same motion information for the sub-block when the encoder module 114 and the decoder module 124 perform the method 300 to store the selected one of the first motion information and the second motion information.

In at least one implementation, the selected one of the first motion information and the second motion information may be a predefined one of the first motion information and the second motion information in the first electronic device 110 and the second electronic device 120. In at least one implementation, the predefined one of the first motion information and the second motion information may be the second motion information.

In some implementation, the decoder module 124 may further determine whether the first list flag of the first motion information is identical to the second list flag of the second motion information when the sub-block is included in the third block area. In at least one implementation, the decoder module 124 may directly store the predefined one of the first motion information and the second motion information as the stored motion information for the sub-block without further checking the relationship between the two reference frames and other reference lists. The decoder module 124 may directly store the predefined motion information without checking whether at least one of the first reference frame and the second reference frame are included in a specific one of the reference lists indicated by a specific one of a plurality of flag values different from the first list flag and the second list flag when the first list flag is identical to the second list flag. For example, the number of the reference lists is equal to two, so the flag values may include zero and one. In one implementation, the specific flag value is equal to one when the first list flag and the second list flag are equal to zero. The first list flag and the second list flag may indicate a first reference list L0 and the specific flag value may indicate a second reference list L1. Thus, the decoder module 124 may directly store the predefined motion information without checking whether at least one of the first reference frame and the second reference frame are included in the second reference list L1 indicated by the specific flag value equal to one when the first list flag and the second list flag are equal to zero.

In at least one implementation, the decoder module 124 may directly store both of the first motion information and the second motion information as the stored motion information for the sub-block when the first list flag is different from the second list flag and the sub-block is included in the third block area 583. In at least one implementation, the decoder module 124 may directly store the predefined one of the first motion information and the second motion information as the stored motion information for the sub-block when the first list flag is different from the second list flag and the sub-block is included in the third block area 583.

At block 370, the decoder module 124 reconstructs the subsequent block based on the stored motion information when the subsequent block is predicted based on the sub-block.

With reference to FIG. 2, the decoder module 124 may keep reconstructing the image frame and a plurality of subsequent frames after the block unit is reconstructed. Therefore, the stored information of the block unit may be used to reconstruct subsequent blocks in the images frame and the subsequent frames. The subsequent frames may include a plurality of unreconstructed frames reconstructed after the reconstruction of the image frame. In addition, the subsequent blocks may include a plurality of unreconstructed blocks in the image frame and the subsequent frames. The unreconstructed blocks may be reconstructed after the reconstruction of the block unit.

Figure 6:
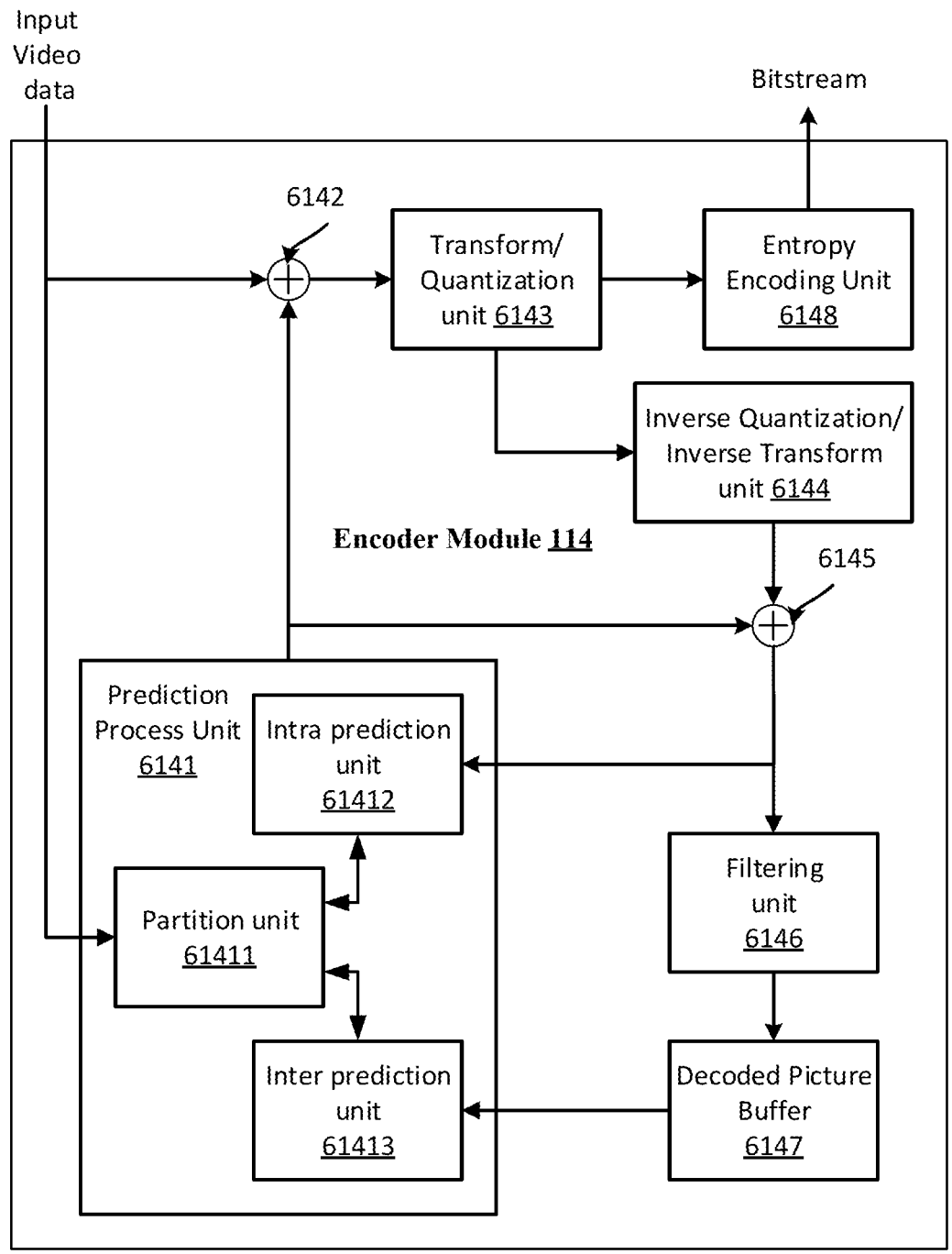
FIG. 6 illustrates a block diagram of the encoder module of the first electronic device in FIG. 1 according to an example implementation of the present disclosure.

FIG. 6 illustrates a block diagram of the encoder module 114 of the first electronic device in FIG. 1 according to an example implementation of the present disclosure. The encoder module 114 may include a prediction processor (e.g., a prediction process unit 6141), at least a first summer (e.g., a first summer 6142) and a second summer (e.g., a second summer 6145), a transform/quantization processor (e.g., a transform/quantization unit 6143), an inverse quantization/inverse transform processor (e.g., an inverse quantization/inverse transform unit 6144), a filter (e.g., a filtering unit 6146), a decoded picture buffer (e.g., a decoded picture buffer 6147), and an entropy encoder (e.g., an entropy encoding unit 6148). The prediction process unit 6141 of the encoder module 114 may further include a partition processor (e.g., a partition unit 61411), an intra prediction processor (e.g., an intra prediction unit 61412), and an inter prediction processor (e.g., an inter prediction unit 61413). The encoder module 114 may receive the source video and encode the source video to output a bitstream.

The encoder module 114 may receive a source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit.

In at least one implementation, the encoder module 114 may perform additional sub-divisions of the source video. It should be noted that implementations are generally applicable to video coding regardless of how the source video is partitioned prior to and/or during the encoding.

In at least one implementation, during the encoding process, the prediction process unit 6141 may receive a current image block of a specific one of the image frames during the encoding process. The current image block may be the luminance block or one of the chrominance blocks in the specific image frame.

The partition unit 61411 may divide the current image block into multiple block units. The intra prediction unit 61412 may perform intra-predictive coding of a current block unit relative to one or more neighboring blocks in the same frame as the current block unit in order to provide spatial prediction. The inter prediction unit 61413 may perform inter-predictive coding of the current block unit relative to one or more blocks in one or more reference image blocks to provide temporal prediction.

In at least one implementation, the prediction process unit 6141 may select one of the coding results generated by the intra prediction unit 61412 and the inter prediction unit 61413 based on a mode selection method, such as a cost function. The mode selection method may be a rate-distortion optimization (RDO) process.

The prediction process unit 6141 may determine the selected coding result and provide a predicted block corresponding to the selected coding result to the first summer 6142 for generating a residual block and to the second summer 6145 for reconstructing the encoded block unit. The prediction process unit 6141 may further provide syntax elements such as motion vectors, intra mode indicators, partition information, and other syntax information to the entropy encoding unit 6148.

In at least one implementation, the intra prediction unit 61412 may intra predict the current block unit. The intra prediction unit 61412 may determine an intra prediction mode directed toward a reconstructed sample neighboring the current block unit in order to encode the current block unit.

In at least one implementation, the intra prediction unit 61412 may encode the current block unit using various intra prediction modes and the intra prediction unit 61412 or the prediction process unit 6141 may select an appropriate intra prediction mode from the selected modes. The intra prediction unit 61412 may encode the current block unit using a cross component prediction mode to predict one of the two chroma components of the current block unit based on the luma components of the current block unit. The intra prediction unit 61412 may predict a first one of the two chroma components of the current block unit based on the second of the two chroma components of the current block unit.

In at least one implementation, the inter prediction unit 61413 may inter predict the current block unit as an alternative to the intra prediction performed by the intra prediction unit 61412. The inter prediction unit 61413 may perform motion estimation to estimate motion of the current block unit for generating a motion vector.

The motion vector may indicate a displacement of the current block unit within the current image block relative to a reference block unit within a reference image block. The inter prediction unit 61413 may receive at least one reference image block stored in the decoded picture buffer 6147 and estimate the motion based on the received reference image blocks to generate the motion vector.

In at least one implementation, the first summer 6142 may generate the residual block by subtracting the prediction block determined by the prediction process unit 6141 from the original current block unit. The first summer 6142 may represent the component or components that perform this subtraction operation.

In at least one implementation, the transform/quantization unit 6143 may apply a transform to the residual block in order to generate a residual transform coefficient and then quantize the residual transform coefficients to further reduce bit rate. The transform may be one of a DCT, DST, AMT, MDNSST, HyGT, signal dependent transform, KLT, wavelet transform, integer transform, sub-band transform or a conceptually similar transform.

In at least one implementation, the transform may convert the residual information from a pixel value domain to a transform domain, such as a frequency domain. The degree of quantization may be modified by adjusting a quantization parameter.

In at least one implementation, the transform/quantization unit 6143 may perform a scan of the matrix including the quantized transform coefficients. Alternatively, the entropy encoding unit 6148 may perform the scan.

In at least one implementation, the entropy encoding unit 6148 may receive a plurality of syntax elements from the prediction process unit 6141 and the transform/quantization unit 6143 including a quantization parameter, transform data, motion vectors, intra modes, partition information, and other syntax information. The entropy encoding unit 6148 may encode the syntax elements into the bitstream.

In at least one implementation, the entropy encoding unit 6148 may entropy encode the quantized transform coefficients by performing CAVLC, CABAC, SBAC, PIPE coding or another entropy coding technique to generate an encoded bitstream. The encoded bitstream may be transmitted to another device (i.e., the second electronic device 120 in FIG. 1) or archived for later transmission or retrieval.

In at least one implementation, the inverse quantization/inverse transform unit 6144 may apply inverse quantization and inverse transformation to reconstruct the residual block in the pixel domain for later use as a reference block. The second summer 6145 may add the reconstructed residual block to the prediction block provided from the prediction process unit 6141 in order to produce a reconstructed block for storage in the decoded picture buffer 6147.

In at least one implementation, the filtering unit 6146 may include a deblocking filter, a SAO filter, a bilateral filter, and/or an ALF to remove blocking artifacts from the reconstructed block. Additional filters (in loop or post loop) may be used in addition to the deblocking filter, the SAO filter, the bilateral filter and the ALF. Such filters are not illustrated for brevity and may filter the output of the second summer 6145.

In at least one implementation, the decoded picture buffer 6147 may be a reference picture memory that stores the reference block for use by the encoder module 114 to encode video, such as in intra or inter coding modes. The decoded picture buffer 6147 may include a variety of memory devices such as DRAM, including SDRAM, MRAM, RRAM), or other types of memory devices. The decoded picture buffer 6147 may be on-chip with other components of the encoder module 114 or off-chip relative to those components.

In at least one implementation, the encoder module 114 may perform the example reconstruction method 300 for reconstructing a block unit as illustrated in FIG. 3. The method 300 may be performed using the configurations illustrated in FIG. 1 and FIG. 8 and various elements of these figures are referenced with regard to the method 300. Each block illustrated in FIG. 3 may represent one or more processes, methods, or subroutines performed. Furthermore, the order of blocks is illustrative only and may change. Additional blocks may be added or less blocks may be utilized without departing from the present disclosure.

At block 310, an encoder module 114 receives an image frame of video data and determines a block unit from the received image frame according to the received video data. The video data may be a video.

In at least one implementation, with reference to FIGS. 1 and 6, the first electronic device 110 may receive the video via the source module 112. The encoder module 114 may determine the image frame from the video and divide the image frame to determine the block unit.

In at least one implementation, the prediction process unit 6141 of the first electronic device 110 may determine the block unit from the video via the partition unit 61411 and the encoder module 114 may provide a plurality of partition indications into a bitstream based on a partition result of the partition unit 61411.

At block 320, the encoder module 114 determines a split line of the block unit based on a split angle and a split distance of the block unit.

In at least one implementation, with reference to FIG. 6, the encoder module 114 may generate a plurality of coding results generated by the intra prediction unit 61412 and the inter prediction unit 61413. Then, the encoder module 114 may select one of the coding results based on a mode selection method, such as a cost function. The mode selection method may be a rate-distortion optimization (RDO) process. In at least one implementation, the encoder module 114 may divide the block unit into a plurality of prediction areas and predict the block unit by respectively predicting each of the prediction areas when the selected coding result is generated based on the split line.

In at least one implementation, the split line may be determined by an inclined angle of the split line and a line offset between the split line and a center point of the block unit when the split line is generated based on a geometric partition mode. Thus, the encoder module 114 may provide, into the bitstream, a partition index of the split line indicating the inclined angle and the line offset. In the present implementation, with reference to FIGS. 4C-4D, the encoder module 114 may divide the block unit 400 based on the split line 420 to determine the prediction areas 441-443. In the present implementation, a third one of the prediction areas 443 covers the split line 420 and separates a first one of the prediction areas 441 from a second one of the prediction areas 442.

At block 330, the encoder module 114 determines first motion information and second motion information from a candidate list to reconstruct the block unit based on the first motion information, the second motion information and the split line.

In at least one implementation, with reference to FIG. 6, the encoder module 114 may predict the prediction areas of the block unit based on the first motion information and the second motion information when the selected coding result is generated based on the split line, the first motion information and the second motion information.

In at least one implementation, the first motion information and the second motion information may be included in a merge candidate list of the block unit. In at least one implementation, a plurality of merge candidate modes in the merge candidate list may be generated for a merge mode. In at least one implantation, the first motion information may indicate a first reference frame and a first reference vector, and the second motion information may indicate a second reference frame and a second reference vector. The first reference frame and the second reference frame may be selected from a plurality of reference lists of the block unit.

In at least one implementation, with reference to FIG. 1 and FIG. 6, the first summer 6142 of the encoder module 114 in the first electronic device 110 may generate a residual block based on the selected coding result and provide a bitstream to the second electronic device 120 including a plurality of coefficients corresponding to a plurality of residual components in the residual block.

In at least one implementation, the encoder module 114 may reconstruct the block unit again based on the selected coding result for predicting the other block units in the image frame. The block unit may be reconstructed by adding the selected coding result into the residual block of the block unit.

At block 340, the encoder module 114 determines a sub-block in the block unit and determines a parameter value of the sub-block based on a location of the sub-block, the split angle and the split distance.

In at least one implementation, with reference to FIG. 5A and FIG. 6, the encoder module 114 may divide the block unit 400 to generate a plurality of sub-blocks 561-576. In at least one implementation, the encoder module 114 may determine the parameter value for each of the sub-blocks 561-576. In at least one implementation, a corresponding one of the parameter values may be computed for a specific one of the sub-blocks 561-576 based on a location of the specific sub-block and the split line 420 determined according to the split angle and the split distance. In at least one implementation, the encoder module 114 may determine four corners of the specific sub-block, determine a plurality of weighting parameters for the four corners of the specific sub-block based on a relationship between the location of the specific sub-block and the split line, and compute the parameter value for the specific sub-block based on the weighting parameters. In at least one implementation, the parameter value may be generated by averaging the plurality of weighting parameters of the four corners of the specific sub-block. In at least one implementation, the encoder module 114 may determine the parameter value for each of the sub-blocks 561-576 based on the other computing methods.

At block 350, the encoder module 114 compares the parameter value with at least one of a first threshold and a second threshold.

In at least one implementation, with reference to FIG. 5A and FIG. 6, the encoder module 114 may categorize the sub-blocks 561-576 of the block unit 400 into a plurality of block areas based on the comparison between the parameter values and the at least one of the first threshold and the second threshold. Therefore, the block areas may be divided from the block unit 400 based on the parameter values of the sub-blocks generated according to the locations of the sub-blocks and the split line.

In at least one implementation, a specific one of the sub-blocks may be included in a first one of the three block areas when a corresponding one of the parameter values of the specific sub-block is less than or equal to the first threshold. In addition, the specific sub-block may be included a second one of the three block areas when the corresponding parameter value of the specific sub-block is greater than or equal to the second threshold, and the specific sub-block may be included in a third one of the three block areas when the corresponding parameter value of the specific sub-block is greater than the first threshold and less than the second threshold. In at least one implementation, the second threshold may be greater than the first threshold.

In the present implementation, the first block area 581 and the second block area 582 may be separated by the third block area 583 covering the split line 420. In at least one implementation, the prediction areas 441-443 are different from the block areas 581-583.

At block 360, the encoder module 114 stores motion information for the sub-block based on the comparison between the parameter value and the at least one of the first threshold and the second threshold.

In at least one implementation, with reference to FIG. 2 and FIGS. 5B and 5C, the encoder module 114 may determine the stored motion information for a specific one of the sub-blocks from the first motion information and the second motion information based on a corresponding one of the block areas 581-583 determined from the comparison between a corresponding one of the parameter values of the specific sub-block and the at least one of the first threshold and the second threshold.

In at least one implementation, the encoder module 114 may store the first motion information for the specific sub-block when the specific sub-block having the corresponding parameter value less than or equal to the first threshold is included in the first block area 581 corresponding to the first prediction area 441. In addition, the encoder module 114 may store the second motion information for the specific sub-block when the specific sub-block having the corresponding parameter value greater than or equal to the second threshold is included in the second block area 582 corresponding to the second prediction area 442.

In at least one implementation, the encoder module 114 may directly select one of the first motion information and the second motion information to decrease the usage of a buffer and decrease the coding complexity when the specific sub-block having the corresponding parameter value within the value range is included in the third block area 583 corresponding to the third prediction area 443. Thus, with reference to FIG. 1, the encoder module 114 and the decoder module 124 may store the same one of the two motion information for the sub-block when the encoder module 114 and the decoder module 124 perform the method 300 to store the selected one of the first motion information and the second motion information.

In at least one implementation, the selected one of the first motion information and the second motion information may be a predefined one of the first motion information and the second motion information in the first electronic device 110 and the second electronic device 120. In at least one implementation, the predefined one of the first motion information and the second motion information may be the second motion information.

In some implementation, the encoder module 114 may further determine whether the first list flag of the first motion information is identical to the second list flag of the second motion information when the sub-block is included in the third block area. The decoder module 124 may directly store the predefined motion information without checking whether at least one of the first reference frame and the second reference frame are included in a specific one of the reference lists indicated by a specific one of a plurality of flag values different from the first list flag and the second list flag when the first list flag is identical to the second list flag.

In at least one implementation, the encoder module 114 may directly store both of the first motion information and the second motion information as the stored motion information for the sub-block when the first list flag is different from the second list flag and the sub-block is included in the third block area 583. In at least one implementation, the encoder module 114 may directly store the predefined one of the first motion information and the second motion information as the stored motion information for the sub-block when the first list flag is different from the second list flag and the sub-block is included in the third block area 583.

At block 370, the encoder module 114 reconstructs the subsequent block based on the stored motion information when the subsequent block is predicted based on the sub-block.

In at least one implementation, with reference to FIG. 6, the encoder module 114 may keep predicting the image frame and a plurality of subsequent frames after the block unit is reconstructed. Therefore, the stored information of the block unit may be used to reconstruct subsequent blocks in the image frame and the subsequent frames. The subsequent frames may include a plurality of unpredicted frames predicted after the reconstruction of the image frame. In addition, the subsequent blocks may include a plurality of unpredicted blocks in the image frame and the subsequent frames. The unpredicted blocks may be predicted after the reconstruction of the block unit.

The disclosed implementations are to be considered in all respects as illustrative and not restrictive. It should also be understood that the present disclosure is not limited to the specific disclosed implementations but that many rearrangements, modifications, and substitutions are possible without departing from the scope of the present disclosure.

What is claimed is:

1. A method of decoding a bitstream by an electronic device, the method comprising:
   receiving an image frame of the bitstream;
   determining a block unit from the received image frame;
   determining a split line of the block unit based on a split angle and a split distance of the block unit, wherein the split angle and the split distance of the block unit are determined based on the bitstream;
   receiving first motion information and second motion information from a candidate list for reconstructing the block unit based on the first motion information, the second motion information and the split line;
   determining a sub-block in the block unit;
   determining a parameter value of the sub-block based on a location of the sub-block, the split angle and the split distance;
   storing a predefined one of the first motion information and the second motion information as stored motion information for the sub-block when the parameter value is greater than a first threshold and less than a second threshold; and
   reconstructing a subsequent block based on the stored motion information when the subsequent block is reconstructed based on the sub-block.

2. The method according to claim 1, further comprising:
   storing the first motion information as the stored motion information for the sub-block when the parameter value is less than or equal to the first threshold; and
   storing the second motion information as the stored motion information for the sub-block when the parameter value is greater than or equal to the second threshold.

3. The method according to claim 1, further comprising dividing the block unit into three block areas based on the split line.

4. The method according to claim 3, wherein:
   the parameter value is less than or equal to the first threshold when the sub-block is included in a first one of the three block areas;
   the parameter value is greater than or equal to the second threshold when the sub-block is included a second one of the three block areas; and
   the parameter value is greater than the first threshold and less than the second threshold when the sub-block is included in a third one of the three block areas.

5. The method according to claim 4, wherein:
   the first one of the three block areas and the second one of the three block areas are separated by the third one of the three block areas; and
   the third one of the three block areas covers the split line of the block unit.

6. The method according to claim 3, wherein the block unit is further divided based on the split line into three prediction areas, each of the three prediction areas different from the three block areas, a first one of the three prediction areas predicted based on the first motion information, a second one of the three prediction areas predicted based on the second motion information, a third one of the three prediction areas predicted based on the first motion information and the second motion information, the first one of the three block areas and the second one of the three block areas separated by the third one of the three block areas, and the third one of the three block areas covers the split line of the block unit.

7. The method according to claim 1, wherein the parameter value is determined by averaging a plurality of weighting parameters based on the location of the sub-block, the split angle and the split distance for four corners of the sub-block.

8. The method according to claim 1, wherein the predefined one of the first motion information and the second motion information is the second motion information.

9. The method according to claim 1, further comprising:
   comparing a first list flag for selecting a first reference frame with a second list flag for selecting a second reference frame, wherein the first motion information includes the first list flag and the second motion information includes the second list flag;
   storing the predefined one of the first motion information and the second motion information as the stored motion information for the sub-block without checking whether the first reference frame and the second reference frame are included in a specific one of a plurality of reference lists indicated by a specific one of a plurality of flag values, the specific one of the plurality of reference flags different from the first and the second list flags when the first list flag is identical to the second list flag and the parameter value is greater than the first threshold and less than the second threshold; and
   storing the first motion information and the second motion information together as the stored motion information for the sub-block when the first list flag is different from the second list flag and the parameter value is greater than the first threshold and less than the second threshold.

10. An electronic device for decoding a bitstream, the electronic device comprising:
at least one processor; and
a storage device coupled to the at least one processor and storing a plurality of instructions which, when executed by the at least one processor, causes the at least one processor to:
receive an image frame of the bitstream;
determine a block unit from the received image frame;
determine a split line of the block unit based on a split angle and a split distance of the block unit, wherein the split angle and the split distance of the block unit are determined based on the bitstream;
receive first motion information and second motion information from a candidate list for reconstructing the block unit based on the first motion information, the second motion information and the split line;
determine a sub-block in the block unit;
determine a parameter value of the sub-block based on a location of the sub-block, the split angle and the split distance;
store a predefined one of the first motion information and the second motion information as stored motion information for the sub-block when the parameter value is greater than a first threshold and less than a second threshold; and
reconstruct a subsequent block based on the stored motion information when the subsequent block is reconstructed based on the sub-block.

11. The electronic device according to claim 10, wherein the plurality of instructions, when executed by the at least one processor, further causes the at least one processor to:
store the first motion information as the stored motion information for the sub-block when the parameter value is less than or equal to the first threshold; and
store the second motion information as the stored motion information for the sub-block when the parameter value is greater than or equal to the second threshold.

12. The electronic device according to claim 10, wherein the plurality of instructions, when executed by the at least one processor, further causes the at least one processor to:
divide the block unit into three block areas based on the split line, wherein:
the parameter value is less than or equal to the first threshold when the sub-block is included in a first one of three block areas;
the parameter value is greater than or equal to the second threshold when the sub-block is included a second one of the three block areas; and
the parameter value is greater than the first threshold and less than the second threshold when the sub-block is included in a third one of the three block areas.

13. The electronic device according to claim 12, wherein:
the first one of the three block areas and the second one of the three block areas are separated by the third one of the three block areas; and
the third one of the three block areas covers the split line of the block unit.

14. The electronic device according to claim 10, wherein the parameter value is determined by averaging a plurality of weighting parameters based on the location of the sub-block, the split angle and the split distance for four corners of the sub-block.

15. The electronic device according to claim 10, wherein the predefined one of the first motion information and the second motion information is the second motion information.

16. A method of decoding a bitstream by an electronic device, the method comprising:
receiving an image frame of the bitstream;
determining a block unit from the received image frame;
determining a split line of the block unit based on a split angle and a split distance of the block unit, wherein the split angle and the split distance of the block unit are determined based on the bitstream;
receiving first motion information and second motion information from a candidate list for reconstructing the block unit based on the first motion information, the second motion information and the split line;
determining a sub-block in the block unit;
determining a parameter value of the sub-block based on a location of the sub-block, the split angle and the split distance;
determining whether to store a predefined one of the first motion information and the second motion information as stored motion information for the sub-block based on a comparison between the parameter value and a value range; and
reconstructing a subsequent block based on the stored motion information when the subsequent block is reconstructed based on the sub-block.

17. The method according to claim 16, further comprising:
storing the predefined one of the first motion information and the second motion information as the stored motion information for the sub-block when the parameter value is included in the value range of a first threshold to a second threshold;
storing the first motion information as the stored motion information for the sub-block when the parameter value is less than or equal to the first threshold; and
storing the second motion information as the stored motion information for the sub-block when the parameter value is greater than or equal to the second threshold.

18. The method according to claim 16, wherein the parameter value is determined by averaging a plurality of weighting parameters based on the location of the sub-block, the split angle and the split distance for four corners of the sub-block.

19. The method according to claim 16, wherein the predefined one of the first motion information and the second motion information is the second motion information.

* * * * *